United States Patent Office 3,558,734
Patented Jan. 26, 1971

3,558,734
ISOMERIZATION OF OLEFINS
John W. Myers, Bartlesville, Okla., assignor to Phillips Petroleum Company, a corporation of Delaware
No Drawing. Filed Aug. 26, 1968, Ser. No. 755,440
Int. Cl. C07c 5/24
U.S. Cl. 260—683.2    10 Claims

ABSTRACT OF THE DISCLOSURE

A process for the isomerization of olefins in which a halogen-containing compound or water is introduced into the catalyst zone either continuously or intermittently to improve conversion and selectivity.

---

This invention relates to skeletal isomerization, that is, to the conversion of unbranched hydrocarbons into branch hydrocarbons having the same number of carbon atoms.

In one of its more specific aspects, this invention relates to the selectivity and skeletal isomerization.

Skeletal isomerization of hydrogen diluted olefins is known. In this process, unbranched or lightly branched olefins are contacted with special catalysts having both isomerization of hydrogenation activity, in the presence of hydrogen, and a high yield of branched or more highly branched hydrocarbons is obtained. Conversion is normally carried out at an elevated temperature and pressure.

The catalyst used generally is a solid isomerization catalyst such as eta- and gamma-alumina, alumina-boria, halogen acid-treated alumina, or halogen compound-treated alumina, and the like. The process is generally applicable to the isomerization of olefins having 4 to about 20 carbon atoms, preferably from about 4 to about 10 carbon atoms. Specifically, the process is used to form isobutene from normal butenes, methyl pentenes and dimethylbutenes from normal hexenes, and so forth.

Two aspects of the process are of significance. The first is conversion which, in isomerization of hydrogen-diluted butenes, for example, refers to the percentage conversion of the olefin to compounds other than normal butenes. The second of these is selectivity which, in isomerization of hydrogen-diluted butenes, for example, refers to per-pass yield of isobutene divided by per-pass conversion.

There has now been discovered a method for increasing selectivity when isomerizing hydrogen-diluted olefins, using conventional catalysts under conventional operating conditions. This method involves the addition of a halogen compound or of water to the reaction zone, the halogen compound or water being added to the catalytic reaction zone in quantities from about 5 to about 100 parts per million (p.p.m.) parts of olefin feed, preferably from about 20 to 100 parts per million of olefin feed.

The process is operated at pressures in the range from about 0 to about 100 p.s.i.g., preferably in the range of about 0 to about 50 p.s.i.g., this range minimizing olefin hydrogenation while sustaining catalyst activity.

The temperature of the reaction zone will normally be maintained at about 400° to about 1200° F.; the olefin feed to the reaction zone will have a liquid hourly space velocity, measured at 60° F., of about 0.1 to about 30 volumes of liquid pervolume of catalyst per hour. Hydrogen dilution will normally be from about 0.5:1 to about 20:1 mols of hydrogen per mol of olefin.

Any halogen compound can be used, suitable compounds having been found to be the hydrogen halides, the haloforms, the carbon tetrahalides, the alkyl halides such as isopropyl chloride, the chlorofluoroparaffins such as Freons, the alkylene halides, and like compounds, and mixtures thereof. The halogen compound or the water can be added intermittently or continuously to the reaction zone. Addition can be with, or separate from, the olefin feed and can be made in the absence of olefin feed, for example, with a hydrogen carrier during intermittent operation. Further, the olefin feed may be diluted with inert materials, such as paraffins or other hydrocarbons, carbon dioxide and nitrogen.

The water can be added as a liquid, as steam, or can be introduced as oxygen or air—the water being formed in situ within the reaction zone, through the oxidation of hydrogen to form water.

The catalyst can be employed in any manner conventional within the art, such as in a fixed bed, a fluidized bed, and the like. Catalyst can be used in any form such as 10/20 mesh granules, 1/16" extrudate, microspheres, and the like.

Any feedstock which is conventionally employed in isomerization processes may be processed by the method of this invention.

The following examples illustrate this invention.

EXAMPLE I

A hydrogen-diluted butene-2 charge stock, having a hydrogen to olefin mol ratio of about 8.8 to 1, was isomerized over 10/20 mesh granules of gamma-alumina catalyst impregnated with 1 weight percent hydrogen chloride. The reaction was conducted at a temperature of about 900° F., at about atmospheric pressure, and at a liquid hourly space velocity of about 1.4.

After about 74 hours' reaction time, two portions of anhydrous HCl were added to the catalyst bed. The HCl was added directly to the olefin feed in pulsate injections, this being the most convenient method of addition under existing circumstances. These additions were made by adding two 13.5-cc. portions of HCl in about 20 minutes, equivalent to about 44 parts HCl per million parts of olefin feed per day. Concentrations of HCl or water specified as being added in the following examples are expressed in a similar manner.

Results were as follows:

|  | Duration of run, Hrs. | | |
|---|---|---|---|
|  | 7.2 | 74.1 | 74. |
| Product analysis, wt. percent: | | | |
| Propane and lighter | 1.7 | 1.3 | 0.7 |
| Butanes | 4.8 | 8.0 | 3.0 |
| Isobutene | 33.5 | 28.1 | 29.4 |
| Normal-butene | 57.9 | 59.2 | 64.1 |
| Pentanes and heavier | 2.1 | 3.4 | 2.8 |
| Conversion, wt. percent | 42.1 | 40.8 | 35.9 |
| Selectivity, wt. percent | 79.6 | 68.9 | 81.9 |

These data indicate that both conversion and selectivity had, after 74.1 hours, decreased from those values realized after 7.2 hours. However, with the addition of the anhydrous HCl to the catalyst, selectivity was so greatly improved that an increased yield of isobutene was obtained at a lower total conversion.

EXAMPLE II

The operation described above was continued. After a total operating time of about 79.5 hours, selectivity had again decreased. Accordingly, during approximately the next 120 hours, portions of anhydrous HCl were periodically injected into the catalyst zone by inclusion into the feed. Nine such portions were added, each being equivalent to 44 parts per million parts of olefin feed. Additions were made as follows.

Time, hrs. operation:                         Portions added
    97 _____ 1
    121 _____ 1
    152 _____ 3
    170 _____ 2
    174 _____ 2

Analyses were made after 197 hours and the results compare with that data previously set forth, as follows:

|  | Duration of run, hrs. | | |
|---|---|---|---|
|  | 74.9 | 79.5 | 197.5 |
| Product Analysis, wt. percent: |  |  |  |
| Propane and lighter | 0.7 | 1.0 | 0.8 |
| Butanes | 3.0 | 4.8 | 1.8 |
| Isobutene | 29.4 | 32.1 | 33.1 |
| Normal-butene | 64.1 | 59.5 | 61.9 |
| Pentanes and heavier | 2.8 | 2.6 | 2.4 |
| Conversion, wt. percent | 35.9 | 40.5 | 38.1 |
| Selectivity, wt. percent | 81.9 | 79.3 | 86.9 |

These data indicate improvement in the selectivity of the skeletal isomerization by the intermittent addition of the halogen over extended periods of operation.

EXAMPLE III

Eta-alumina catalyst, in the form of $\frac{1}{16}''$ extrudate, was impregnated with aqueous ammonia bifluoride to a content of 0.5 weight percent fluorine. Hydrogen-diluted butene-2, at a hydrogen molal ratio of 8.8 to 1, was passed over this catalyst at 885° F. at atmospheric pressure and a liquid hourly space velocity of 1.15. After about 21 hours of continuous operation, two portions of anhydrous HCl were injected into the olefin stream in the amount of 44 parts per million parts of feed for the purpose of depositing on the catalyst. Analyses before and after this injection were as follows:

|  | Duration of run, hrs. | |
|---|---|---|
|  | 21 | 23 |
| Product analysis, wt. percent: |  |  |
| Propane and lighter | 2.0 | 2.0 |
| Butanes | 6.4 | 3.2 |
| Isobutene | 28.2 | 34.5 |
| Normal-butenes | 59.6 | 52.9 |
| Pentenes and heavier | 3.8 | 7.4 |
| Conversion, wt. percent | 40.4 | 47.1 |
| Selectivity, wt. percent | 69.8 | 73.2 |

These data indicate improvement in conversion and selectivity when eta-alumina catalyst is contacted with a halogen different from that with which the catalyst was originally impregnated.

EXAMPLE IV

Eta-alumina catalyst, in the form of $\frac{1}{16}''$ extrudate, was contacted with hydrogen-diluted butene-2, the hydrogen-olefin mol ratio being about 8.3 to 1, at atmospheric pressure, 905° F., and a liquid hourly space velocity of 1.2. Initial product compositions and conversions were determined after about 1 hour. After about 44 hours operation, after significant decrease in conversion and selectivity, air was added to the butene-2 stream in a quantity sufficient to form about 29 parts water per million parts of butene-2 feed. An analysis was then made after 46.4 hours operation with the following results:

|  | Duration of run, hrs. | | |
|---|---|---|---|
|  | 1 | 44 | 46.4 |
| Product analysis, wt. percent: |  |  |  |
| Propane and lighter | 2.6 | 1.5 | 0.5 |
| Butanes | 1.7 | 11.2 | 3.7 |
| Isobutene | 29.1 | 11.2 | 10.8 |
| Normal-butene | 64.6 | 75.3 | 84.3 |
| Pentanes and heavier | 2.0 | 0.8 | 0.7 |
| Conversion, wt. percent | 35.4 | 24.7 | 15.7 |
| Selectivity, wt percent | 82.3 | 45.3 | 68.8 |

After water addition the isobutene yield is about the same, but this yield is obtained at a considerably lower total conversion and considerably higher selectivity.

These data show that the activity of the catalyst is restored by the in situ formation of water within the reaction media by the oxidation of the hydrogen of the hydrogen-diluted olefin.

EXAMPLE V

Two portions of eta-alumina catalyst similar to that used in Example IV were heated in hydrogen at 900° F. for approximately sixteen hours. Water was formed within one portion by the oxidation of the hydrogen with air to the extent of forming about 15 parts of water per million parts of butene-2 feed as subsequently charged. Both portions of catalyst were then employed in isomerizing hydrogen-diluted butene-2 under identical conditions, that is, at atmospheric pressure, a temperature of about 900° F., a liquid hourly space velocity of 2.2, and a hydrogen to olefin mol ratio of about 8.8 to 1. Results were as follows:

|  | Catalyst | |
|---|---|---|
|  | Hydrogen-treated | Hydrogen-treated, water-treated |
| Product composition, wt. percent: |  |  |
| Butanes | 8.2 | 4.3 |
| Isobutene | 24.9 | 24.8 |

These data indicate that both catalysts gave comparable isobutene yields but that hydrogenation of the olefin to butane was suppressed when using the water-treated catalyst.

EXAMPLE VI

Referring to Example II, supra, the data shown indicate restoration to high activity after about 197.5 hours when the charge stock had a hydrogen to olefin mol ratio of about 8.8 to 1.

Runs made under comparable conditions, but at a 4 to 1 hydrogen to olefin mol ratio, showed similar results with periodic hydrogen chloride addition, as indicated by the following:

|  | Catalyst age, hrs. | | | | |
|---|---|---|---|---|---|
|  | 19 | 67 | 91 | 210 | 364 |
| HCl added, p.p.m | 0 | 20 | 20 | 40 | 40 |
| Butene l.h.s.v | 2.2 | 2.2 | 2.4 | 2.3 | 2.1 |
| Temperature, ° F | 907 | 907 | 907 | 907 | 907 |
| Pressure, p.s.i.g | 0 | 0 | 0 | 0 | 0 |
| Conversion, wt. percent | 45.9 | 38.7 | 41.7 | 40.3 | 36.0 |
| Selectivity, wt. percent | 76.9 | 80.1 | 76.0 | 89.1 | 86.1 |

Similar data at a hydrogen to olefin mol ratio of 2 to 1 were as follows:

|  | Catalyst age, hrs. | | |
|---|---|---|---|
|  | 1 | 19 | 44 |
| HCl added, p.p.m | 20 | 20 | 20 |
| Butene, l.h.s.v | 2.3 | 2.3 | -- |
| Temperature, ° F | 917 | 917 | 917 |
| Pressure, p.s.i.g | 0 | 0 | 0 |
| Conversion, wt. percent | 38.4 | 25.3 | 17.6 |
| Selectivity, wt. percent | 87.2 | 87.7 | 86.6 |

These data indicate that periodic injection of the halogen is effective in maintaining selectivity at hydrogen to olefin mol ratios at least as low as 2 to 1.

The process of this invention is carried out employing such equipment as conventionally employed in isomerization processes.

It is within the scope of the invention to add both halogen and water to the catalyst and/or olefin feed, either together or individually, and either intermittently or continuously.

While the foregoing discussion has been limited to simplified embodiments of the invention, other embodiments which incorporate the principles set forth herein may be employed but such are not considered as being outside of the scope of this invention.

What is claimed is:

1. A process for the catalytic skeletal isomerization of a hydrogen-diluted olefin having 4 to 20 carbon atoms which comprises contacting said hydrogen-diluted olefin with an isomerization catalyst and with at least one of a halogen compound and liquid water, said halogen compound or said liquid water being introduced into said contact in an amount from about 5 to about 100 parts per million of said olefin, said halogen compound or said liquid water being unassociated with said catalyst when introduced into said contact.

2. The process as defined in claim 1 in which said halogen compound is selected from the group consisting of hydrogen halides, haloforms, carbon tetrahalides, alkyl halides, chlorofluoroparaffins and alkylene halides.

3. The process as defined in claim 1 in which said hydrogen-diluted olefin is butene-2 and said isomerization catalyst is one of eta-alumina and gamma-alumina.

4. The process as defined in claim 3 in which said halogen compound is hydrogen chloride.

5. The process as defined in claim 4 in which said catalyst is impregnated with a halide compound.

6. The process as defined in claim 4 in which said hydrogen chloride is intermittently introduced into said contact.

7. The process as defined in claim 4 in which said hydrogen chloride is introduced into said contact in said hydrogen-diluted olefin.

8. The process as defined in claim 3 in which liquid water is introduced into said contact.

9. The process as defined in claim 7 in which said water is introduced into said contact upon in situ formation of said water.

10. The process as defined in claim 7 in which said water is formed in situ upon oxidation of said hydrogen with air.

References Cited

UNITED STATES PATENTS

| | | | |
|---|---|---|---|
| 2,301,342 | 11/1942 | Sumerford et al. | 260—683.2 |
| 2,395,274 | 2/1946 | Hillyer et al. | 260—683.2 |
| 2,397,639 | 4/1946 | Berg et al. | 260—683.2 |
| 3,114,785 | 12/1963 | Hervert et al. | 260—683.2 |
| 3,248,448 | 4/1966 | Goble et al. | 260—683.2 |
| 2,403,439 | 7/1946 | Ipatieff et al. | 260—683.2 |
| 2,263,026 | 11/1941 | Arveson | 260—683.2 |

DELBERT E. GANTZ, Primary Examiner

V. O'KEEFE, Assistant Examiner